United States Patent [19]

Hock

[11] Patent Number: 4,581,691

[45] Date of Patent: Apr. 8, 1986

[54] BALANCED CONSTANT CURRENT SENSING CIRCUIT INHERENTLY IMMUNE TO LONGITUDINAL CURRENTS

[75] Inventor: Richard H. Hock, Hopatcong, N.J.

[73] Assignee: AT&T Bell Laboratories, Murray Hill, N.J.

[21] Appl. No.: 603,072

[22] Filed: Apr. 23, 1984

[51] Int. Cl.[4] .............................................. H02H 9/08

[52] U.S. Cl. ......................................... 363/21; 363/97

[58] Field of Search ........... 179/18 FA, 27 G, 170 D; 363/19, 21, 22, 97

[56] References Cited

U.S. PATENT DOCUMENTS 4,087,646 5/1978 Brolin et al. .................. 179/18 FA 4,254,443 3/1981 Wilson, Jr. ........................... 363/21

4,385,336 5/1983 Takeshita et al. ............. 179/18 FA

*Primary Examiner*—Patrick R. Salce

*Assistant Examiner*—D. L. Rebsch

*Attorney, Agent, or Firm*—Alfred G. Steinmetz

[57] ABSTRACT

A current converter circuit that supplies send and return currents to a balanced transmission line includes current sensing circuitry that responds to a current unbalance or a differential current, independently of longitudinal currents in the balanced line. A reference voltage and two inputs to a comparator monitor the voltage drop across a voltage divider connecting the send and return leads of the transmission line. The voltage divider has a grounded center tap so that longitudinal currents flow to ground and provide equal and opposite polarity voltages across the divider, which cancel each other. Unbalanced currents provide a corresponding differential voltage input to the comparator, whose control voltage output is utilized to initiate corrective action in a current control circuit.

4 Claims, 3 Drawing Figures

8
15
V(+)
Isc
26
10
12
32
IL
IL
19
Isc
21
25
22
23
REF
6
VREF
+
20
−
VIN
1
11
7
33
13
IL
16
V(-)
IL
14
24
4
RTN
2
CONTROL
3

8
15
V(+)
Iac
10
12
32
IL
IL
36
19
Isc
21
37
25
22
23
REF
6
VREF
+
20
Iac
VIN
1
11
−
33
IL
13
16
V(-)
IL
14
Iac
4
RTN
2
CONTROL
3
24

+VOUT
-VOUT
REF
DRIVE
REF
RAMP

BALANCED CONSTANT CURRENT SENSING CIRCUIT INHERENTLY IMMUNE TO LONGITUDINAL CURRENTS

BACKGROUND OF THE INVENTION

1. Field of the Invention

This invention is concerned with current sensing circuits and more particularly with a current sensing circuit used in the control circuitry of a power converter supplying balanced current to the send and return leads of a transmission line. It is specifically concerned with a current sensing circuit that responds to differential currents and not to longitudinal currents in a balanced transmission line energized by the power converter.

2. Description of the Prior Art

Longitudinal currents are often generated in transmission lines in response to magnetic coupling with other transmission or commercial power lines. The line feed converters that supply these transmission lines with balanced constant current have current control circuits that control the balanced send and return currents. The current sensing circuits used in these current control circuits typically respond to the induced longitudinal currents and attempt to regulate out its effects. These longitudinal currents, if large enough, may drive the current control circuit into saturation and shut the converter down. A suitable current control circuit for line feed converters should ignore longitudinal currents and also accurately limit the send and return currents, should either lead be shorted.

Prior art solutions to the first problem have included the use of large capacitors to bypass longitudinal currents to ground, away from the current sensing circuit. The second problem of responding to short circuits between ground and the send and/or return leads has been dealt with in the prior art by utilizing separate current control circuits for each lead or other similar types of additional current limiting circuitry.

SUMMARY OF THE INVENTION

A current converter for providing a controlled send and return current to a balanced transmission line includes a current sensing circuit for responding to a current unbalanced independently of longitudinal currents in the balanced line. A reference voltage and the two inputs to an error amplifier are series connected and shunt a voltage divider connecting the send and return leads of the line. The voltage divider has a grounded center tap, so that longitudinal currents provide equal and opposite polarity voltages across the divider which cancel each other. Unbalanced currents, which include normal load currents and currents due to short circuit conditions, provide a corresponding differential voltage input to the comparator whose error voltage output is utilized to initiate current limiting of the unbalanced currents in a current control circuit.

DESCRIPTION OF THE DRAWING

An understanding of the invention may be attained by reference to the following detailed specification and the accompanying drawing in which.

DETAILED DESCRIPTION

Figure 1:
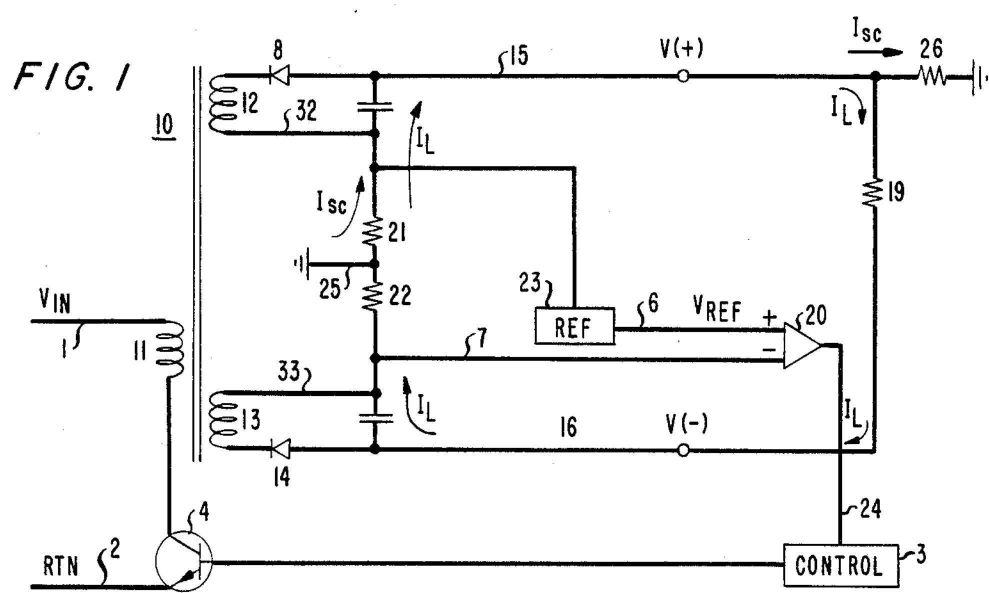
FIG. 1 is a simplified schematic of a converter circuit utilizing a current sensing scheme embodying the principles of the invention and illustrating the current sensing circuit response to differential currents.

A schematic of a converter circuit embodying a current sensing circuit embodying the principles of the invention is shown in FIG. 1. The current sensing circuit is designed to respond to differential currents and effectively ignore longitudinal currents. The converter circuit comprises two input terminals 1 and 2 which accept an input DC voltage source to energize the converter. The input voltage is coupled from input terminal 1 through the primary winding 11 of a power transformer 10, and a power switching transistor 4 back to the input terminal 2. The power switching transistor 4 is controlled by a control unit 3 which includes the necessary circuitry to achieve periodic switching of the power transistor 4 with appropriate voltage and current regulation and current limiting functions.

The converter supplies controlled current to a transmission line having both send and return leads, through which the output current circulates. The power transformer 10 includes two secondary windings 12 and 13. Winding 12 is connected through rectifier diode 8 and a send lead 15 to one terminal of a transmission line shown as load resistor 19 which is a resistive representation of a balanced transmission line impedance. The other terminal of the transmission line represented by load resistor 19 is coupled back through a return lead 16 and rectifier diode 14 to the second secondary winding 13.

The secondary windings 12 and 13 may be bifilar wound and are coupled to supply balanced current flow through send and return lines 15 and 16 respectively to the transmission line represented by load resistor 19. The terminal ends 32 and 33 of windings 12 and 13 are each coupled through the current sensing resistors 21 and 22, respectively, to a common ground reference point 25. Coupled to the end terminals of the series-connected resistors 21 and 22 is the operational amplifier 20, and a reference voltage source 23. Reference voltage source 23 is connected to resistor 21 and to the non-inverting input 6 of the comparator operational amplifier 20. The inverting input 7 is directly connected to resistor 22. The output of the comparator operational amplifier 20 is coupled, via lead 24, back to the control circuit 3 and supplies signals there to effect the desired current limiting operation which responds to differential but not longitudinal currents. These differential currents may be normal load currents or they may be due to short circuit conditions on the balanced transmission line.

As shown by the current flow line $I_L$ a balanced load current designated $I_L$ flows winding 12 and lead 15 to the load 19 and returns from lead 19 through lead 16 and winding 13 through the resistors 21 and 22 back to winding 12. Since the normal load current flows in a uniform direction through resistors 21 and 22, the voltages induced therein are additive and hence cause a voltage differential which, as modified by the voltage of reference voltage source 23, is applied to the inputs 6 and 7 of operational amplifier 20. The total voltage is applied to the operational amplifier 20 which in turn generates an error voltage, permitting current limiting of the load current.

It is apparent from the foregoing that if the load current is balanced (i.e., send current equals return current), no current flows into the ground terminal 25. The send and return currents are of equal magnitude and the return current flowing from return lead 16 flows through the voltage sensing resistors and back into send lead 15. Impedance 26 has been added in FIG. 1 to illustrate one possible connection of a short circuit to the output send lead 15 and the transmission line represented by load resistor 19. When such a short circuit path has occurred, a short circuit current develops which is shown by the current line designated '$I_{SC}$' which flows from the ground terminal 25 through resistor 21 winding 12 and lead 15 and through the shorting impedance 26. It is now apparent that the current that flows through send lead 15 is greater than the current returning via return lead 16 and hence an unbalanced differential current condition exists. Since this added short circuit current flows through resistor 21 but not through resistor 22, the total voltage across resistors 21 and 22 connected in series increases in magnitude and this magnitude is sensed by the operational amplifier 20. As the short circuit current increases in magnitude the current flowing in return lead 16 will correspondingly diminish such that the total voltage across resistors 21 and 22 equals the reference voltage. Eventually the short circuit current reaches a point where the voltage across the resistor 21 is equal to the reference voltage. At this point the operational amplifier 20 responds to the voltage magnitude caused solely by the short circuit current $I_{SC}$ and amplifier 20 will transmit a signal back to the control circuit 3 to effect a current limiting action in the control circuit of the converter. It is readily apparent that a short to return lead 16 would produce a similar response and it need not be discussed in detail.

Figure 2:
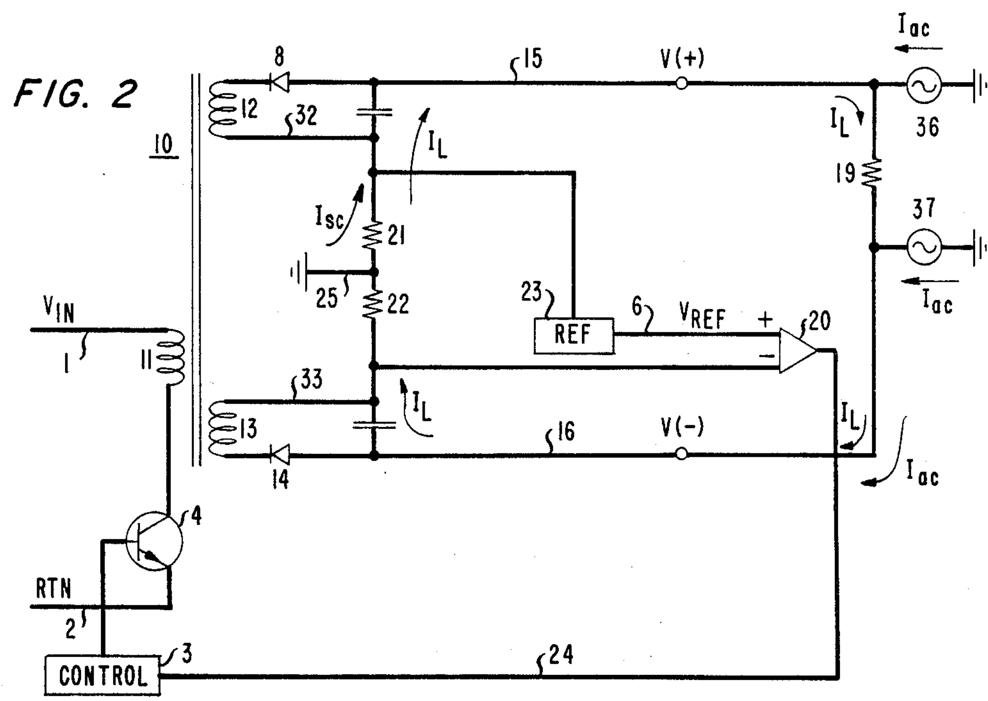
FIG. 2 is the simplified schematic as shown in FIG. 1, but illustrating the current.

The effect of longitudinal currents on the converter circuit and its current sensing arrangement are shown in detail in FIG. 2. In this figure two identical current sources 36 and 37 are shown on each side of the load circuit 19, representing the effects of a typical longitudinal current simultaneously induced in the send and return leads 15 and 16. The currents that are generated, and that may be due to electromagnetic coupling with a power line, are substantially in phase with each other and both flow from their sources through the transmission line, their corresponding send and return lead lines 15 and 16, and back through resistors 21 and 22, respectively, to the ground terminal 25. In this instance the longitudinal current induces voltages poled in opposite directions in the sensing resistors 21 and 22. The voltage that is generated across resistor 21 will be canceled by the voltage developed across resistor 22, provided the sensing resistors 21 and 22 are equal in magnitude. It is readily apparent therefore that the current sensing circuit is operative to respond only to differential loop currents and not to induced longitudinal currents.

Figure 3:
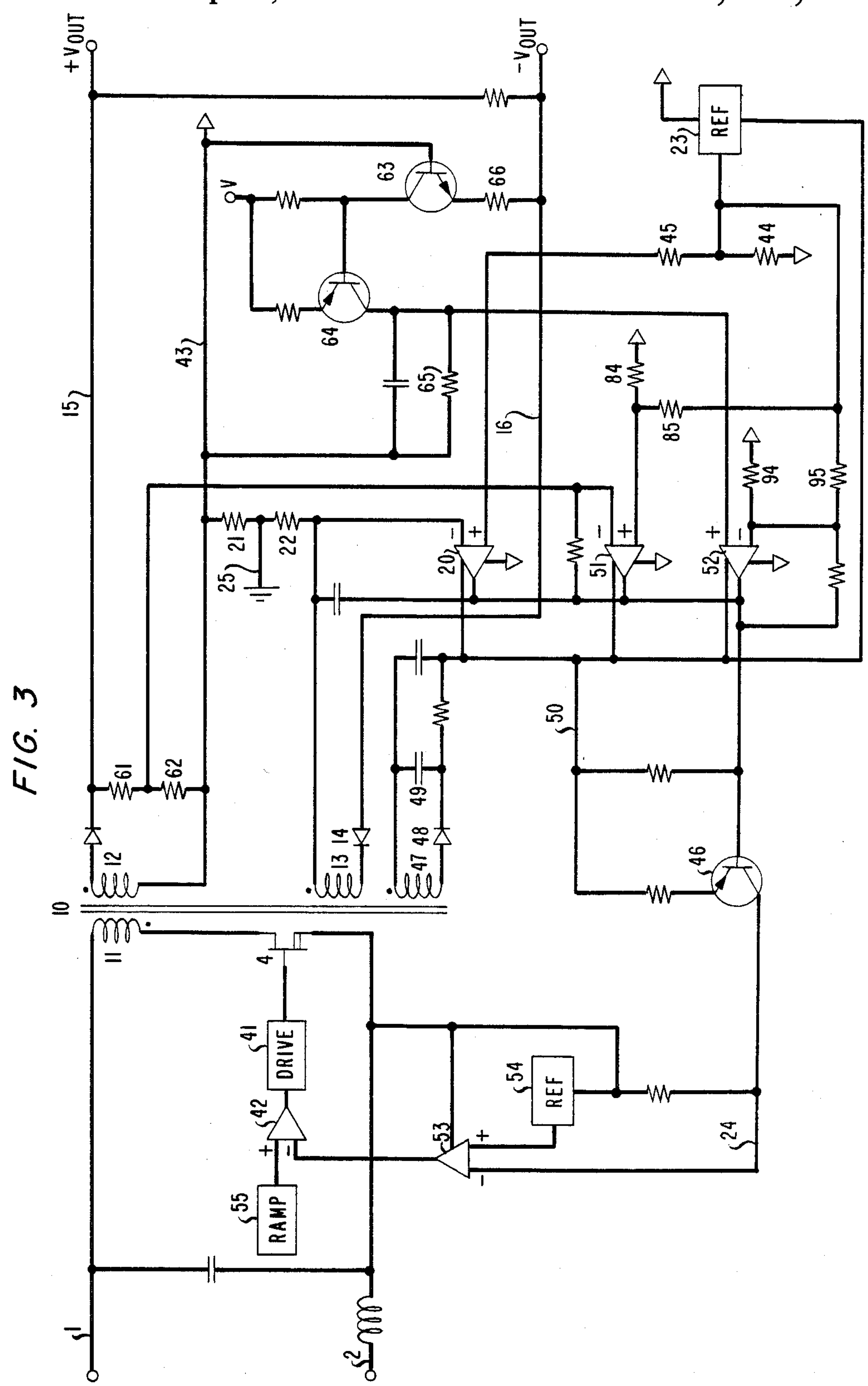
FIG. 3 is a detailed schematic of a power converter utilizing current sensing circuits embodying the principles of the invention.

A more detailed schematic of the converter circuit is illustrated in FIG. 3 wherein the power converter includes control circuitry embodying the principles of the invention for regulating differential currents and further includes voltage limiting control circuits for limiting maximum voltages with respect to ground at both the send and return lead.

A DC voltage source is coupled to input leads 1 and 2 and is periodically coupled to the primary winding 11 of transformer 10 by the switching action of power FET switching device 4. The conductivity of switching device 4 is controlled by the drive circuit 41 which in turn is responsive to comparator circuit 42. Output is derived from the two secondary windings 12 and 13 of transformer 10 and which are coupled to the send and return leads 15 and 16 respectively. One lead of the differential current sensing voltage divider (resistors 21 and 22) is coupled to the common lead 43 of the converter. The common lead 43 is, in turn, coupled to a second voltage divider including resistors 43 and 44 and to a reference voltage source 23. The center tap between resistors 44 and 45 is coupled to the non-inverting input of operational amplifier 20 with the voltage drop across resistor 44 sending a reference voltage. The center tap of the voltage divider comprising resistors 21 and 22 is coupled to a ground reference 25. Common herein is a reference voltage that is common to all the secondary circuitry which may float with reference to ground which is intended herein to represent earth ground. Resistor 22 of the differential current sensing voltage divider is coupled to the inverting input of operational amplifier 20. As discussed above with reference to FIGS. 1 and 2 amplifier 20 responds only to differential currents in the send and return leads 15 and 16 and not longitudinal currents common to both leads.

The output of amplifier 20 is a signal representative of a differential current flow between the send and return leads 15 and 16. This signal is applied to a level shifting circuit including transistor 46. A bias voltage at lead 50 utilized to energize the level shifting circuit is derived from a bias winding 47 which charges a capacitor 49 through rectifying diode 48. This voltage is used to energize not only the level shifting circuit but also reference source 23 and the amplifying circuits 20, 51 and 52 which are used to control output voltage and current of the converter. The level shifter converts the output control voltage of these amplifiers to a signal level suitable for application to the error amplifier 53 on the primary side of the converter. The signal input of error amplifier 53 on lead 24 is compared with a voltage supplied by reference voltage source 54 and the resulting error signal output is coupled to the inverting input of comparator 42. A periodic ramp signal output of generator 55 is applied to the non-inverting input. The comparative levels of the ramp and error signal output of amplifier 53 determines the duty cycle of power switching device 4.

The voltage on send lead 15 is limited by a control signal generated by amplifier 51. The inverting input of amplifier 51 is connected to a center tap of a voltage divider comprising resistors 61 and 62 coupling lead 15 to the common 43. The center tap voltage is representative of the voltage magnitude of lead 15 above common. Resistors 84 and 85 form a voltage divider connected to the output of reference source 23 with the center tap coupled to the non-inverting input of amplifier 51. The signal output of amplifier 51 is applied, via level shifter transistor 46, to error amplifier 53 and used to limit the maximum value relative to common that the voltage on lead 15 can attain.

The voltage on return lead 16 is also limited in the same manner relative to common. This return lead voltage is coupled by resistor 66 to a level shifter comprising transistors 63 and 64, which reduces its value and changes its polarity from negative to positive. The resulting shifted and inverted voltage is applied to resistor 65 and the voltage drop there across is coupled, via lead 67, to the non-inverting input of amplifier 52. Resistors 94 and 95 form a voltage divider connected to reference source 23 and with its center tap coupled to the non-inverting input of amplifier 52. The signal output of amplifier 52 is applied, via level shifter transistors 46, to error amplifier 53 and is used to limit the maximum value relative to common that the voltage on lead 16 can attain.

The outputs of amplifiers 51 and 52 are coupled jointly to the level shifting transistor 46 as is the output of amplifier 20. The output of the level shifter is in turn applied to error amplifier 53, where its response to any or all of the these control signals is the same as described above with reference to the differential current sensing signal.

It is readily apparent that the converter circuit described herein has three modes of protection. One is a differential current limiting mode that is impervious to the longitudinal currents, and the other two are send or return lead voltage limiting.

What is claimed is:

1. A current converter coupled to energize a transmission line and including:

current control circuitry for limiting differential current in a transmission line having send and return leads comprising:

an amplifier circuit including first and second inputs, a reference ground, a first resistance coupling the send lead to the reference ground, a second resistance coupling the return lead to the reference ground, a reference voltage source connected to the first resistance and to the first input of the amplifier circuit, the reference voltage source connecting a terminal of the first resistance other than that connected to the reference ground to the first input of the amplifier circuit, and the second input of the amplifier circuit being directly connected to a terminal of the second resistance other than that connected to the reference ground.

2. A current converter coupled to energize a pair of conductors and including:

circuitry for detecting differential current flow while rejecting longitudinal current in the pair of conductors comprising:

a first resistor for generating a first voltage in response to current flow in a first line of the pair of conductors, a second resistor for generating a second voltage in response to current flow in a second line of the pair of conductors, the first and second resistor each having a first and second terminal, means for combining the first and second resistors so that differential current flow causes the first and second voltages to be additive and longitudinal current flow causes the first and second voltage to cancel each other, the means for combining comprising a grounded reference node connected to a first terminal of each of the first and second resistors, means for accepting a reference voltage, means for amplifying the first voltage as summed with the reference voltage with the second voltage, the means for amplifying comprising an operational amplifier having an inverting and non-inverting input, the means for accepting the reference voltage coupling a second terminal of the first resistor to the non-inverting input, and the second terminal of the second resistor being connected to the inverting input.

3. A current converter coupled to energize a balanced transmission line including:

current control circuitry for monitoring a current balance between send and return leads of the transmission line comprising:

first and second current sensing means for generating voltages responsive to current levels and each coupling a ground of the balanced transmission line to the send and return leads respectively, so that voltages due to longitudinal currents nullify each other and voltages due to differential currents are additive, the first and second current sensing means comprising first and second resistors connected to the ground of the balanced transmission line and having their non-grounded ends connected to the send and return lead respectively and the first and second resistors being of equal magnitude, a reference voltage source, a comparator circuit, the reference voltage source being connected between the first resistor and the comparator circuit, the comparator circuit having a first terminal connected to the first current sensing means and to the reference voltage and a second terminal connected to the second current sensing means, and converter control means responsive to the comparator circuit.

4. A current converter as defined in claim 1 wherein the first and second resistance are of equal value.

* * * * *